United States Patent [19]

Nilsson

[11] 4,364,282
[45] Dec. 21, 1982

[54] SCREW AND NUT MECHANISM
[75] Inventor: Sven W. Nilsson, Partille, Sweden
[73] Assignee: SKF Nova AB, Goteberg, Sweden
[21] Appl. No.: 181,462
[22] Filed: Aug. 26, 1980
[30] Foreign Application Priority Data
  Sep. 13, 1979 [SE] Sweden ............................... 7607609
[51] Int. Cl.³ ............................................. F16N 11/18
[52] U.S. Cl. ................................................. 74/424.8 A
[58] Field of Search ............... 74/424.8 A, 424.8 NA, 74/459, 59
[56] References Cited
  U.S. PATENT DOCUMENTS
  2,236,492  3/1941  Costello ................................ 74/459
  2,581,482  1/1952  Hawkins ............................... 74/459
  2,618,166 11/1952  Douglas ................................ 74/459
  2,969,689  1/1961  Martens ....................... 74/424.8 NA
  3,006,212 10/1961  Galonska .............................. 74/459
  3,176,535  4/1965  Rowland .............................. 74/459
  3,261,224  7/1966  Anthony .............................. 74/459
  4,272,476  6/1981  Benton ............................. 74/459 X Primary Examiner—Nile C. Byers, Jr.
Attorney, Agent, or Firm—Eugene E. Renz, Jr.

[57] ABSTRACT

The invention relates to a mechanism with a screw (1) and a nut made of two sheet metal halves (4, 5) and having two complementary helical grooves (12, 13, 14, 15) which constitute raceways for a number of rolling bodies (16, 17) circulating in at least one closed loop around the screw. In order to provide a mechanism with small dimensions and good circulation conditions for the rolling bodies, the groove in a cylindrical portion of the nut surrounding the screw is provided with a recessed portion (18, 19) with a pitch that is different from the rest of the groove, said recessed portion constituting a return portion of the closed loop over a ridge (3) between two adjacent groove turns in the screw.

5 Claims, 2 Drawing Figures

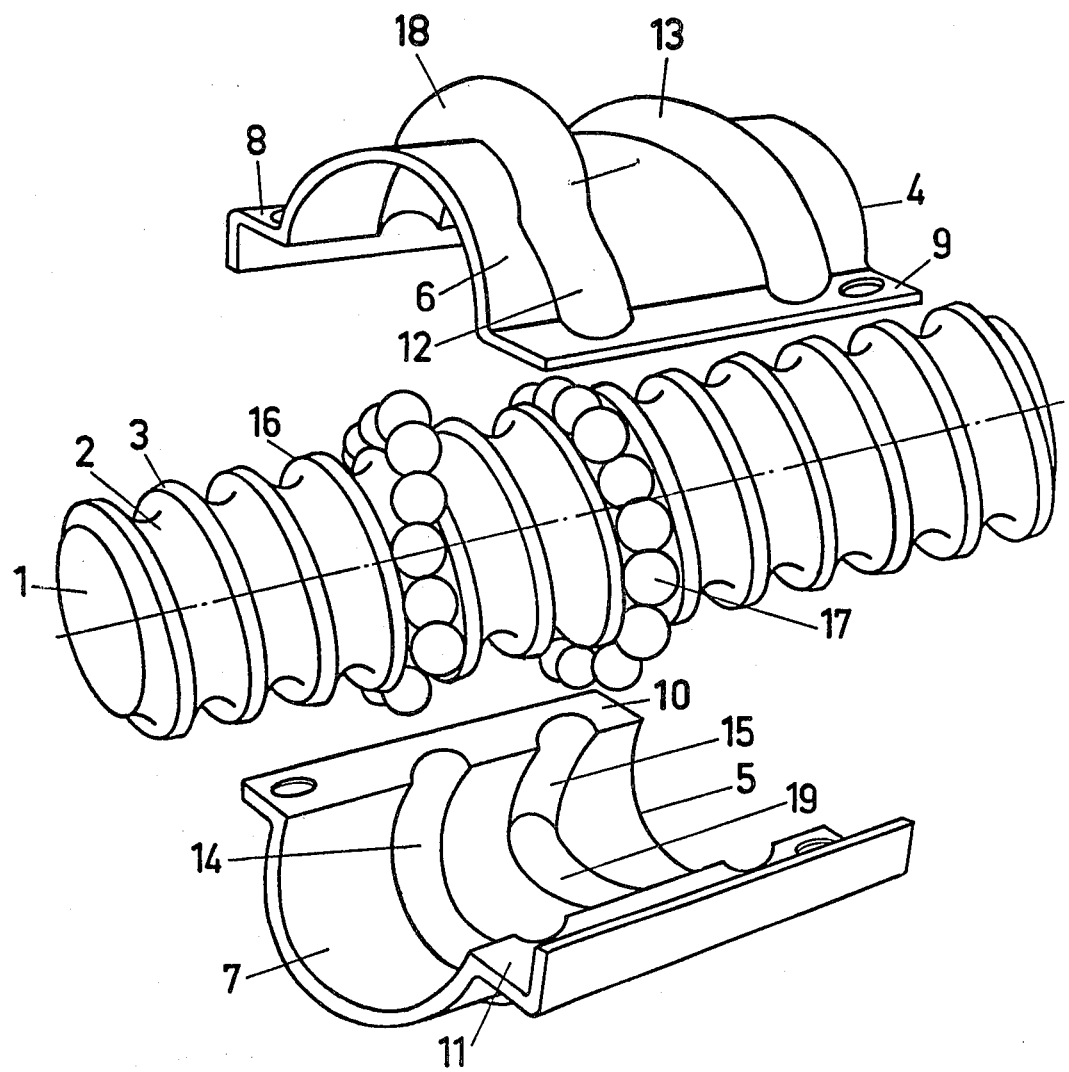
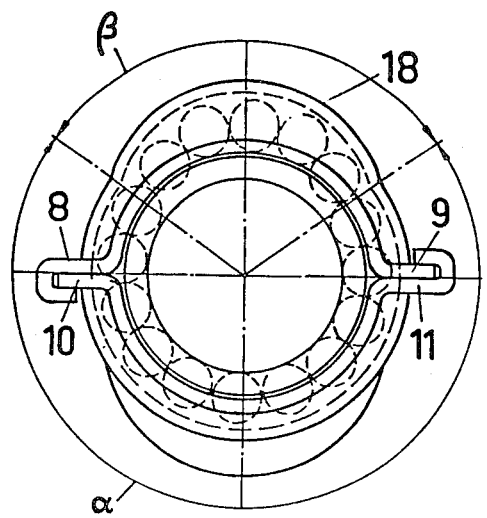

SCREW AND NUT MECHANISM

The invention relates to a mechanism of the kind stated in the introduction of the appended claim 1.

Screw and nut mechanisms with re-circulating rolling bodies are commonly used to transform a rotational movement into a linear movement or the reverse with minimum friction losses. In order to make the mechanism more inexpensive, the nut portion can be made of a pressed sheet metal in two halves with axial flanges in which the halves are connected. Examples of such mechanisms are shown in the U.S. Pat. Nos. 2,581,482 and 3,006,212.

The problem of obtaining a re-circulation of the rolling bodies is solved in the mechanisms according to the above mentioned publications by providing return channels in the longitudinal radial flanges which are present at either side of the cylindrical portions of each nut half. This entails that the flanges and thereby the whole mechanism gets a considerable radial extension, which requires space. Furthermore, the design gives the raceway of the rolling bodies a sharp bend where the raceway ceases to follow the curved surface of the screw and starts to follow the plane shape of the flange in a radial direction. This may cause noise, running troubles and increased wear.

The object of the present invention is to provide a screw and nut device, the nut of which can be produced in a simple and inexpensive way, which can be easily mounted, which takes up little space and which gives the raceway of the rolling bodies an advantageous shape. This is achieved according to the invention by providing the mechanism with the characterizing features mentioned in the accompanying claim 1.

The nut in such a mechanism can be produced quickly and easily and with a good precision by e.g. pressing of sheet metal pieces and joining the nut parts by folding of the flange portions which are situated opposite to each other.

In the following, the invention will be further described with reference to the accompanying drawing, in which FIG. 1 shows a split view of a mechanism, and FIG. 2 shows a cross section of a mounted mechanism according to one embodiment of the invention.

FIG. 1 shows a portion of a screw 1 provided with a helical groove 2, which is limited by a helical ridge 3. The screw is surrounded by a nut made of two parts 4, 5 in the form of sheet metal halves. Each half comprises a cylindrical portion 6, 7 covering about 180° of the screw. The cylindrical portions are ending with plane portions 8, 9, 10, 11 which can be jointed two by two for forming a complete nut. For example, the portions 8 and 11 can be folded around the portions 10 and 9, respectively, as shown in FIG. 2. Grooves 12, 13, 14, 15 are provided in the cylindrical portion of the nut halves, which grooves correspond to the groove 2 in the screw 1 and form together with groove 2 when the nut is mounted raceways for a number of rolling bodies in form of balls 16, 17 which circulate in two closed loops. The balls keep the screw and the nut together and make it possible to rotate the screw relative to the nut with insignificant friction losses.

In order to provide for re-circulation of the balls over a ridge between two adjacent groove turns in the screw, the groove 12 in the nut half 4 and the groove 15 in the nut half 5 have a recessed portion 18 and 19, respectively, with a pitch which is different from the pitch of the rest of the groove, so that the portions 18 and 19 run obliquely over the ridge 3. When the rolling bodies are situated in the part of the raceway which is constituted by these portions, they are unloaded and returned over the ridge into the adjacent groove turn in the screw. The loop of each rolling body thus constitutes one turn around the screw, and the rolling bodies are loaded in more than 180° of the loop and unloaded only in the return portions 18 and 19, respectively, which is best shown in FIG. 2, in which the loaded zone is marked with alpha and the unloaded zone with beta. Since the rolling bodies are led close to the ridge in return portion of the raceway, the direction changes in the raceway are the least possible, which makes the running condition the most favorable.

Also, other embodiments of the invention than the one described above are possible within the limits of the claims. For example, the mechanism may comprise a single or more than two closed loops of rolling bodies. The return portions 18, 19 in the grooves of the nut can be provided in the same nut half if, for example, the load on the nut has a constant direction radially, whereby, of course, the return portions are arranged in the unloaded nut half. The nut halves may also be joined otherwise than by folding the flanges, e.g. by riveting, welding or screwing.

What is claimed is:

1. A screw and nut mechanism comprising
   a screw having helical grooves with helical ridges therebetween
   a nut formed from two half portions having complementary grooves which in combination with said screw grooves constitute raceways for at least one closed loop of rolling bodies
   each half of said nut provided with said grooves enclosing approximately 180° of said screw
   at least one of said grooves in each of said nut half including a recessed portion integrally contained therein adjacent the screw threads to provide unloading and returning of the rolling bodies over said helical ridges of said screw and having a pitch different from the rest of said groove
   said rolling bodies circulating in a closed loop unload and return over said ridge between two adjacent turns of the groove in the screw so that the loop defines one turn of the screw.

2. A mechanism comprising a screw (1) and a nut enclosing the screw, each having complementary helical grooves (2, 12, 13, 14, 15, 18, 19) constituting raceways for a number of rolling bodies (16, 17) circulating in a closed loop, the nut being made from two sheet metal halves, each half having a cylindrical portion (6, 7) provided with grooves and enclosing about 180° of the screw and surrounded by portions (8, 9, 10, 11) by which the halves are connected to each other, characterized by a portion of the groove in at least one cylindrical portion integrally contained therein (18, 19) being an enlarged recess proximate the main portion of the screw and adjacent said grooves of the screw and of a pitch opposite to that of the rest of the groove, said rolling bodies being unloaded in said enlarged recess to permit return over a ridge (3) between two adjacent turns of the groove in the screw whereby the closed loop of the rolling bodies define one turn around the screw.

3. A mechanism according to claim 2 wherein each nut half has two grooves whereby one of said grooves includes a return portion.

4. A mechanism according to claim 2 wherein the mechanism comprises two closed loops of rolling bodies.

5. A mechanism according to claim 2 wherein the nut halves are connected to each other by a flat portion in each half being folded around an opposite flat portion in the respective half.

* * * * *